(12) United States Patent
El Ayach et al.

(10) Patent No.: US 10,887,869 B2
(45) Date of Patent: *Jan. 5, 2021

(54) METHOD AND APPARATUS FOR LIGHTWEIGHT MESSAGING DURING INITIAL SYNCHRONIZATION, DISCOVERY, AND ASSOCIATION IN DIRECTIONAL WIRELESS SYSTEMS

(71) Applicant: QUALCOMM Incorporated, San Diego, CA (US)

(72) Inventors: Omar El Ayach, San Jose, CA (US); Sundar Subramanian, San Diego, CA (US); John Edward Smee, San Diego, CA (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,280

(22) Filed: Feb. 8, 2019

(65) Prior Publication Data

US 2019/0174478 A1 Jun. 6, 2019

Related U.S. Application Data

(63) Continuation of application No. 14/318,542, filed on Jun. 27, 2014, now Pat. No. 10,321,435.

(51) Int. Cl.
*H04W 72/04* (2009.01)
*H04W 48/12* (2009.01)
*H04W 16/28* (2009.01)

(52) U.S. Cl.
CPC ....... *H04W 72/0406* (2013.01); *H04W 16/28* (2013.01); *H04W 48/12* (2013.01); *H04W 72/048* (2013.01); *H04W 72/0446* (2013.01)

(58) Field of Classification Search
CPC . H04W 72/0406; H04W 48/12; H04W 16/28; H04W 72/0446; H04W 72/048;
(Continued)

(56) References Cited

U.S. PATENT DOCUMENTS 7,054,554 B1 5/2006 McNamara et al.
8,189,555 B2 5/2012 Wu et al.
(Continued)

FOREIGN PATENT DOCUMENTS

CN 103581093 A 2/2014
JP 2010200161 A 9/2010
(Continued)

OTHER PUBLICATIONS

Hailan P., et al., "Extended User/Control Plane Architectures for Tightly Coupled LTE/WiGig Interworking in Millimeter-Wave Heterogeneous Networks", IEEE Wireless Communications and Networking Conference (WCNC), Mar. 9, 2015 (Mar. 9, 2015), pp. 1548-1553, XP032786567, DOI: 10.1109/WCNC.2015.7127698 [retrieved on Jun. 17, 2015] IV. Proposed Tightly Coupled LTE/WIGIG Radio Interworking Solution.
(Continued)

*Primary Examiner* — Ricky Q Ngo
*Assistant Examiner* — Michael K Phillips
(74) *Attorney, Agent, or Firm* — Arent Fox LLP

(57) ABSTRACT

A method, an apparatus, and a computer program product for wireless communication are provided. The apparatus receives a discovery signal transmitted from a connection point (CP) via a directional beam. The discovery signal may include first information (including beam sweep configuration information) related to the CP. The apparatus then transmits an association signal to the CP based on the beam sweep configuration information and monitors for a resource grant from the CP based on the transmitted association
(Continued)

signal. Alternatively, the apparatus transmits a discovery signal via a directional beam to a user equipment (UE). The discovery signal may include first information (including beam sweep configuration information) related to the apparatus. The apparatus then receives an association signal from the UE based on the beam sweep configuration information and determines a resource grant for communicating with the UE based on the received association signal.

26 Claims, 15 Drawing Sheets

(58) Field of Classification Search
CPC . H04W 72/046; H04W 48/16; H04W 72/042; H04W 74/0833; H04W 24/10; H04W 74/002; H04W 56/001; H04W 74/006; H04B 7/0617; H04B 7/0695; H04B 7/0408; H04B 7/088; H04B 7/086; H04B 7/0619
See application file for complete search history.

(56) References Cited

U.S. PATENT DOCUMENTS

| | | | |
|---|---|---|---|
| 8,606,873 B2 | 12/2013 | Park et al. | |
| 9,100,799 B1 | 8/2015 | Thiagarajan et al. | |
| 2005/0064872 A1* | 3/2005 | Osseiran | H04B 7/0408 455/452.1 |
| 2007/0287384 A1 | 12/2007 | Sadri et al. | |
| 2008/0247371 A1 | 10/2008 | Kwon et al. | |
| 2010/0157955 A1 | 6/2010 | Liu et al. | |
| 2010/0159845 A1* | 6/2010 | Kaaja | H04B 7/088 455/70 |
| 2010/0202434 A1* | 8/2010 | Wu | H01Q 21/205 370/345 |
| 2010/0234016 A1 | 9/2010 | Palanki et al. | |
| 2010/0248632 A1* | 9/2010 | Bhushan | H04L 9/3271 455/63.1 |
| 2010/0265922 A1 | 10/2010 | Bracha | |
| 2011/0007721 A1 | 1/2011 | Taghavi et al. | |
| 2011/0205969 A1 | 8/2011 | Ahmad et al. | |
| 2011/0280333 A1 | 11/2011 | Yang et al. | |
| 2012/0082052 A1 | 4/2012 | Oteri et al. | |
| 2012/0190381 A1 | 7/2012 | Choi et al. | |
| 2012/0249372 A1 | 10/2012 | Jovicic et al. | |
| 2012/0320874 A1* | 12/2012 | Li | H04W 48/12 370/331 |
| 2013/0072244 A1 | 3/2013 | Jeong et al. | |
| 2013/0121185 A1* | 5/2013 | Li | H04W 72/046 370/252 |
| 2013/0201938 A1 | 8/2013 | Seol et al. | |
| 2013/0235742 A1* | 9/2013 | Josiam | H04B 7/0695 370/252 |
| 2014/0011543 A1 | 1/2014 | Li et al. | |
| 2014/0112220 A1 | 4/2014 | Kwak et al. | |
| 2014/0177607 A1 | 6/2014 | Li et al. | |
| 2014/0185481 A1 | 7/2014 | Seol et al. | |
| 2014/0204822 A1* | 7/2014 | Park | H04W 52/0216 370/311 |
| 2014/0307654 A1* | 10/2014 | Kim | H04B 7/0647 370/329 |
| 2015/0004918 A1 | 1/2015 | Wang et al. | |
| 2015/0109910 A1 | 4/2015 | Hurd et al. | |
| 2015/0201368 A1 | 7/2015 | Cudak et al. | |
| 2015/0208444 A1 | 7/2015 | Park et al. | |
| 2015/0237572 A1 | 8/2015 | Kim et al. | |
| 2015/0341105 A1* | 11/2015 | Yu | H04B 7/0619 370/328 |
| 2015/0382171 A1 | 12/2015 | Roy et al. | |
| 2015/0382334 A1 | 12/2015 | El al. | |
| 2016/0212631 A1* | 7/2016 | Shen | H04W 56/001 |
| 2016/0345278 A1* | 11/2016 | Chu | H04B 7/0413 |
| 2017/0005716 A1* | 1/2017 | Reial | H04B 7/0695 |
| 2017/0034812 A1 | 2/2017 | Deng et al. | |

FOREIGN PATENT DOCUMENTS

| | | |
|---|---|---|
| JP | 2013520937 A | 6/2013 |
| KR | 20140063890 A | 5/2014 |
| WO | 2008004609 A1 | 1/2008 |
| WO | 2010091315 A1 | 8/2010 |
| WO | 2013086164 A1 | 6/2013 |
| WO | 2013108114 A1 | 7/2013 |
| WO | 2014009250 A1 | 1/2014 |
| WO | 2014019618 A1 | 2/2014 |

OTHER PUBLICATIONS

International Search Report and Written Opinion—PCT/US2015/035548—ISA/EPO—dated Sep. 2, 2015.
Kojima F., et al., "Necessary Modifications on Conventional IEEE802.15.3b MAC to Achieve IEEE802.15.3c Millimeter Wave WPAN", IEEE International Symposium on Personal, Indoor and Mobile Radio Communications, PIMRC, IEEE, PI, Sep. 1, 2007 (Sep. 1, 2007), pp. 1-5, XP031168693, ISBN: 978-1-4244-1143-6.
Lee et al., "Method and Apparatus for Scanning Access Point in Wireless Communication System", May 27, 2015, KR, KR1020140063890, English language machine translation.pp. 33.
Park H., et al., "Cooperative Neighbor Disco Very for Consumer Devices in mmWave ad-hoc Networks", IEEE International Conference on Consumer Electronics (ICCE), Jan. 13, 2012 (Jan. 13, 2012), pp. 100-101, XP032124786, DOI: 10.1109/ICCE.2012.6161759, ISBN: 978-1-4577-0230-3, II. Cooperative Neighbor Discovery (CoopND).
Vip D., et al., "Initial Beamforming for mmWave Communications", IEEE 48th Asilomar Conferenceon Signals, Systems and Computers, Nov. 2, 2014 (Nov. 2, 2014), pp. 1926-1930, XP032769050, DOI: 10.1109/ACSSC.2014.7094805 [retrieved on Apr. 24, 2015], II. Problem Description, III. Implementing Precoding, IV. Procedure.
Barati C.N., et al., "Directional Cell Search for Millimeter Wave Cellular Systems", 2014 IEEE 15th International Workshop on Signal Processing Advances in Wireless Communications (SPAWC), IEEE, Jun. 22, 2014 (Jun. 22, 2014), XP032672209, pp. 120-124, DOI: 10.1109/SPAWC.2014.6941329 [retrieved on Oct. 31, 2014] the whole document.
European Search Report—EP19207990—Search Authority—Munich—dated Feb. 3, 2020.

* cited by examiner

METHOD AND APPARATUS FOR LIGHTWEIGHT MESSAGING DURING INITIAL SYNCHRONIZATION, DISCOVERY, AND ASSOCIATION IN DIRECTIONAL WIRELESS SYSTEMS

CROSS REFERENCE TO RELATED APPLICATION(S)

This application is a Continuation of U.S. Non-Provisional application Ser. No. 14/318,542, entitled "METHOD AND APPARATUS FOR LIGHTWEIGHT MESSAGING DURING INITIAL SYNCHRONIZATION, DISCOVERY, AND ASSOCIATION IN DIRECTIONAL WIRELESS SYSTEMS" and filed on Jun. 27, 2014, the disclosure of which is expressly incorporated by reference herein in its entirety.

BACKGROUND

Field

The present disclosure relates generally to communication systems, and more particularly, to embedding data beyond information related to a cell ID or device ID in initial synchronization and association signals exchanged between a connection point (CP) and user equipment (UE).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Millimeter wave (mmW) systems functioning at higher carrier frequencies may occupy a bandwidth much larger than what is possible in most commercial microwave systems, e.g., cellular systems. In both mmW systems and cellular systems, the initial stages of communication between a connection point (CP) and a UE allow for initial synchronization and discovery. In the mmW systems that use beamforming to combat propagation path loss with an array gain, an initial stage of communication allows the UE to estimate a direction to neighboring CPs for the purpose of beamformed communication and data exchange. The signaling procedure is also further designed to allow the UE to inform the CP of its presence and associate with the CP. In cellular systems, the UE may inform the CP of its presence by transmitting a random access channel (RACH) signal to the CP, and vice versa. However, only a few bits of data may actually be conveyed during an initial signaling process. Accordingly, what is needed is a mmW system functioning at a higher carrier frequency and leveraging a larger bandwidth to at least accelerate discovery.

SUMMARY

In an aspect of the disclosure, a method, a computer program product, and an apparatus are provided. The apparatus for wireless communication receives a discovery signal transmitted from a connection point (CP) via a directional beam. The discovery signal may include first information related to the CP, wherein the first information includes beam sweep configuration information of the CP. The apparatus then transmits an association signal to the CP based on the beam sweep configuration information and monitors for a resource grant from the CP based on the transmitted association signal.

In another aspect, the apparatus transmits a discovery signal via a directional beam to a user equipment (UE). The discovery signal may include first information related to the apparatus, wherein the first information includes beam sweep configuration information of the apparatus. The apparatus then receives an association signal from the UE based on the beam sweep configuration information and determines a resource grant for communicating with the UE based on the received association signal.

DETAILED DESCRIPTION

Figure 1:
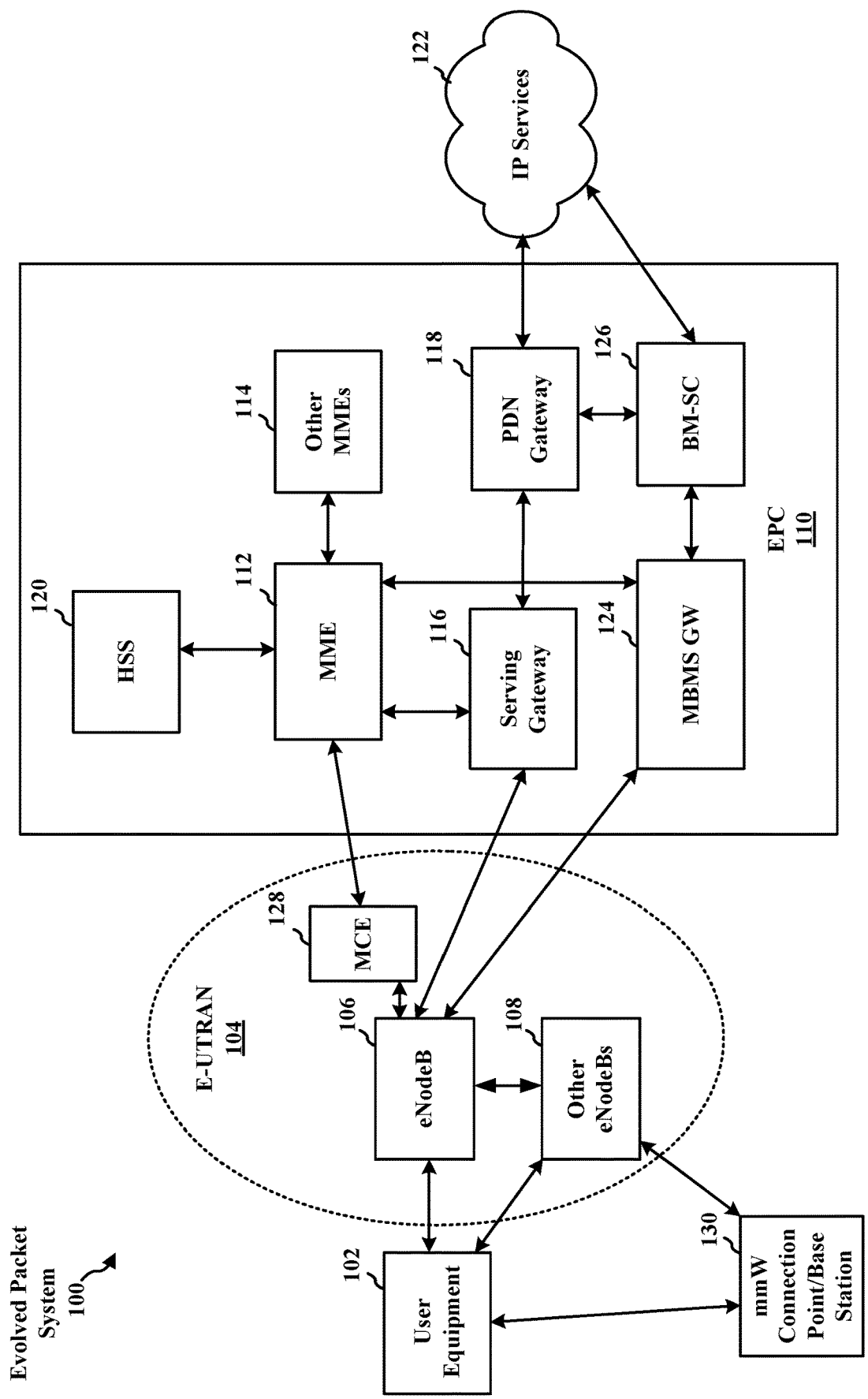
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMES 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and a millimeter wave (mmW) system. Accordingly, the UE 102 may communicate with the eNB 106 and/or the other eNBs 108 over a LTE link. Additionally, the UE 102 may communicate with a connection point (CP) or base station (BS) 130 (capable of mmW system communication) over a mmW link.

In a further aspect, at least one of the other eNBs 108 may be capable of communicating signals via the LTE network and the mmW system. As such, an eNB 108 may be referred to as a LTE+mmW eNB. In another aspect, the CP/BS 130 may be capable of communicating signals via the LTE network and the mmW system. As such, the CP/BS 130 may be referred to as a LTE+mmW CP/BS. The UE 102 may communicate with the other eNB 108 over a LTE link as well as over a mmW link.

In yet another aspect, the other eNB 108 may be capable of communicating signals via the LTE network and the mmW system, while the CP/BS 130 is capable of communicating signals via the mmW system only. Accordingly, the CP/BS 130 unable to signal the other eNB 108 via the LTE network may communicate with the other eNB 108 over a mmW backhaul link. Techniques for embedding data beyond information related to a cell ID or device ID in initial discovery, synchronization, and/or association signals exchanged between a CP 130 and a UE 102 in a directional wireless network such as EPS 100 is discussed in further detail infra.

Figure 2:
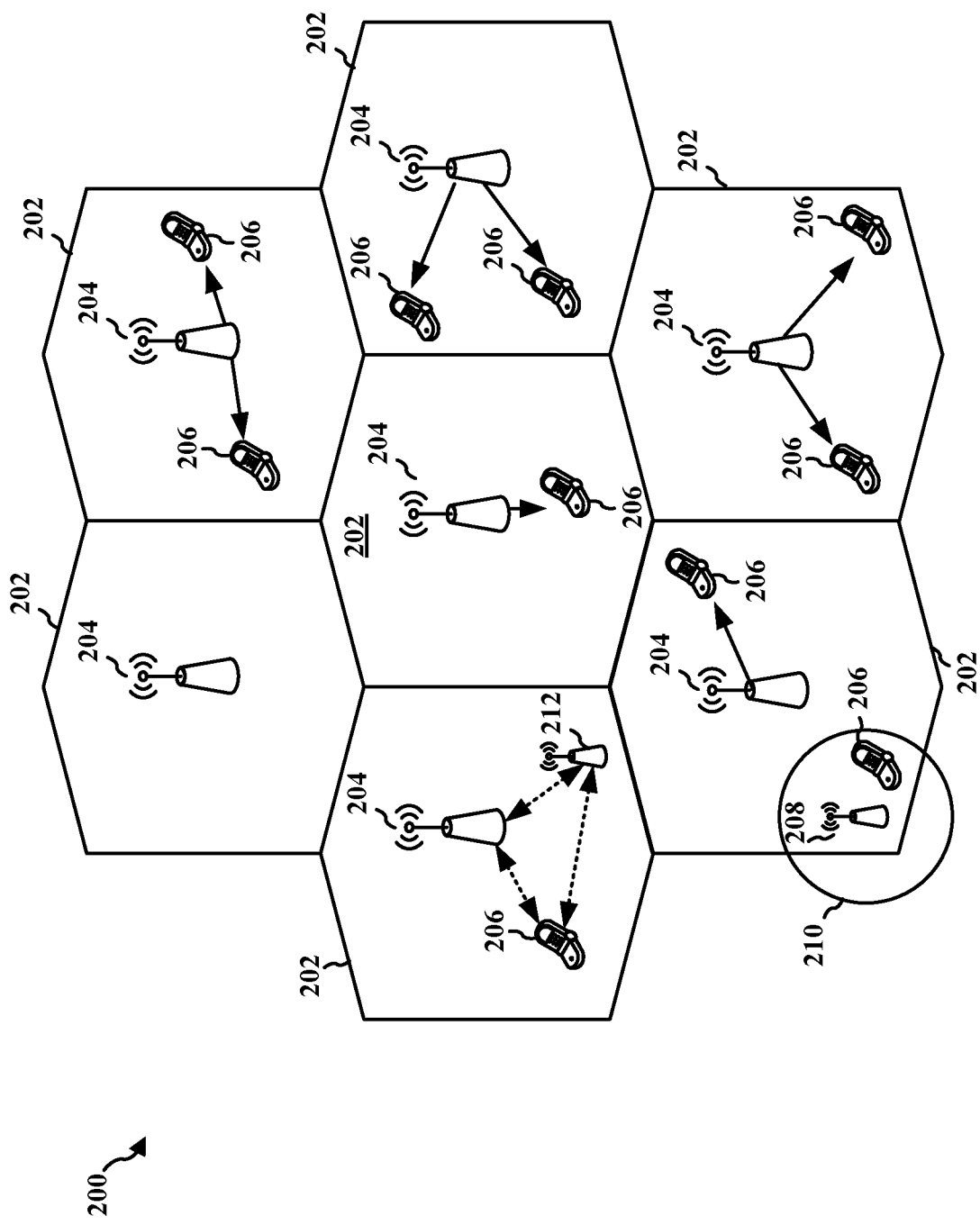
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and a millimeter wave (mmW) system. Accordingly, the UE 206 may communicate with the eNB 204 over a LTE link and communicate with a connection point (CP) or base station (BS) 212 (capable of mmW system communication) over a mmW link. In a further aspect, the eNB 204 and the CP/BS 212 may communicate signals via the LTE network and the mmW system. As such, the UE 206 may communicate with the eNB 204 over a LTE link and a mmW link (when the eNB 204 is capable of mmW system communication), or communicate with the CP/BS 212 over a mmW link and a LTE link (when the CP/BS 212 is capable of LTE network communication). In yet another aspect, the eNB 204 communicates signals via the LTE network and the mmW system, while the CP/BS 212 communicates signals via the mmW system only. Accordingly, the CP/BS 212 unable to signal the eNB 204 via the LTE network may communicate with the eNB 204 over a mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
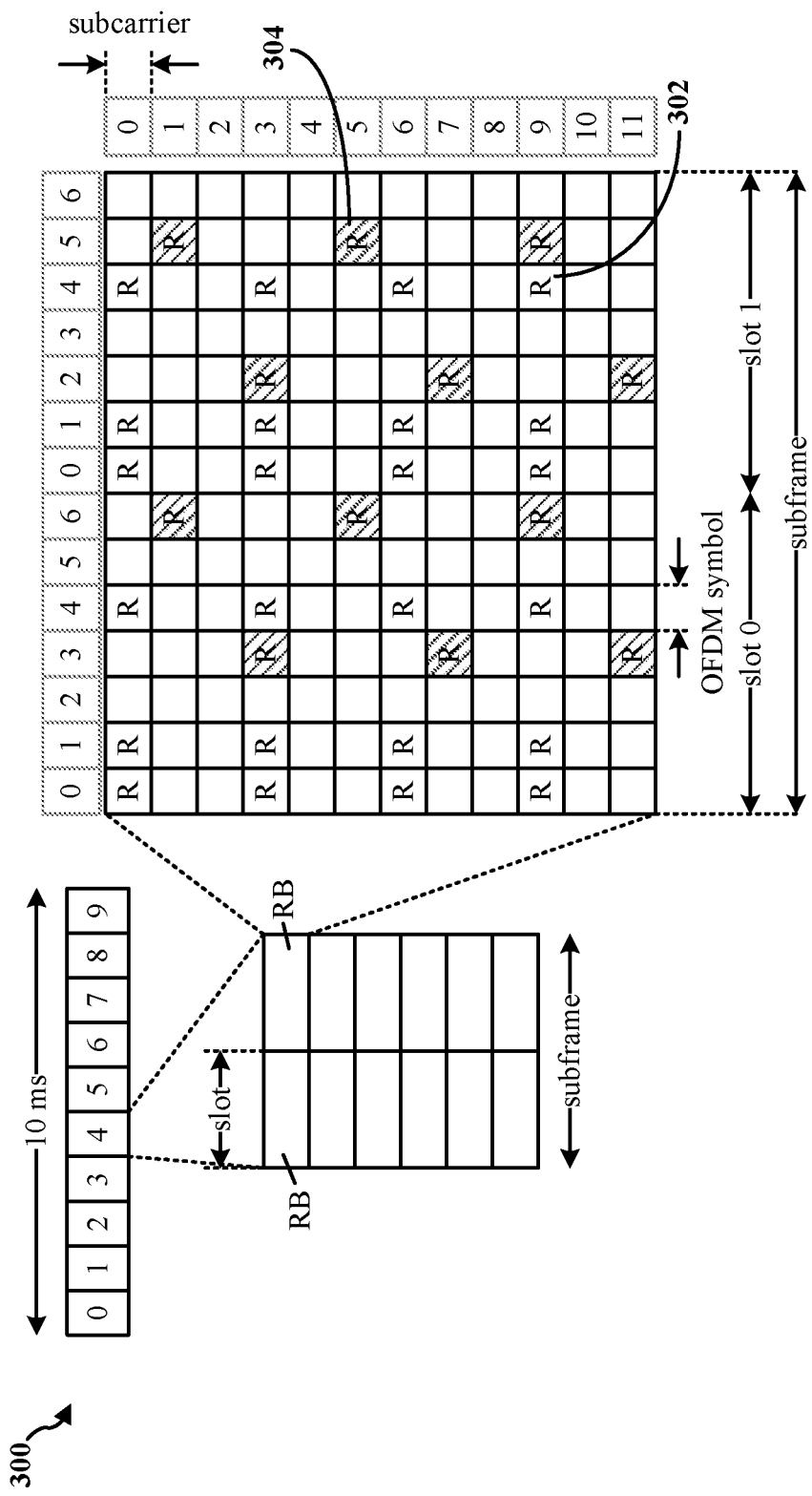
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
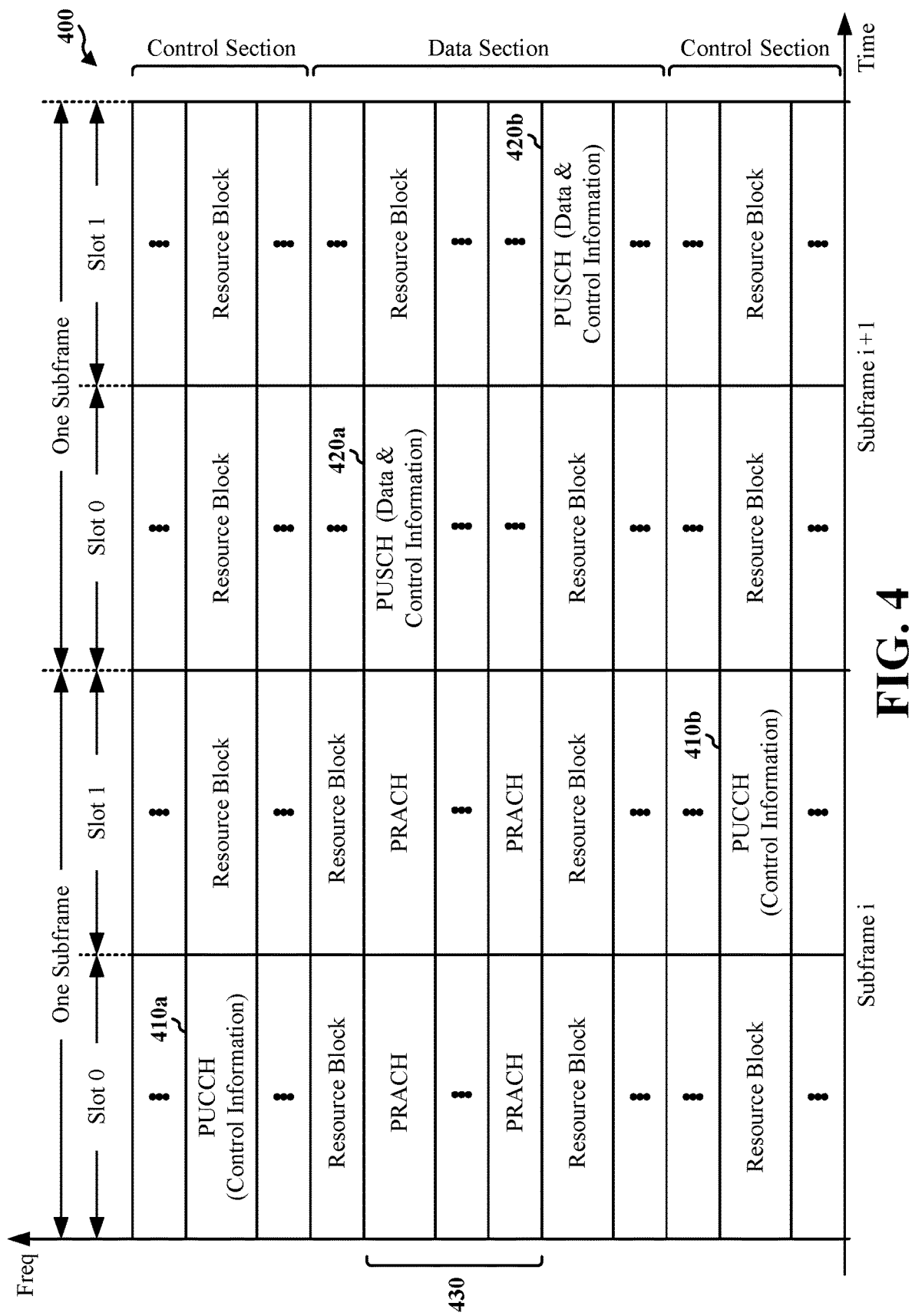
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
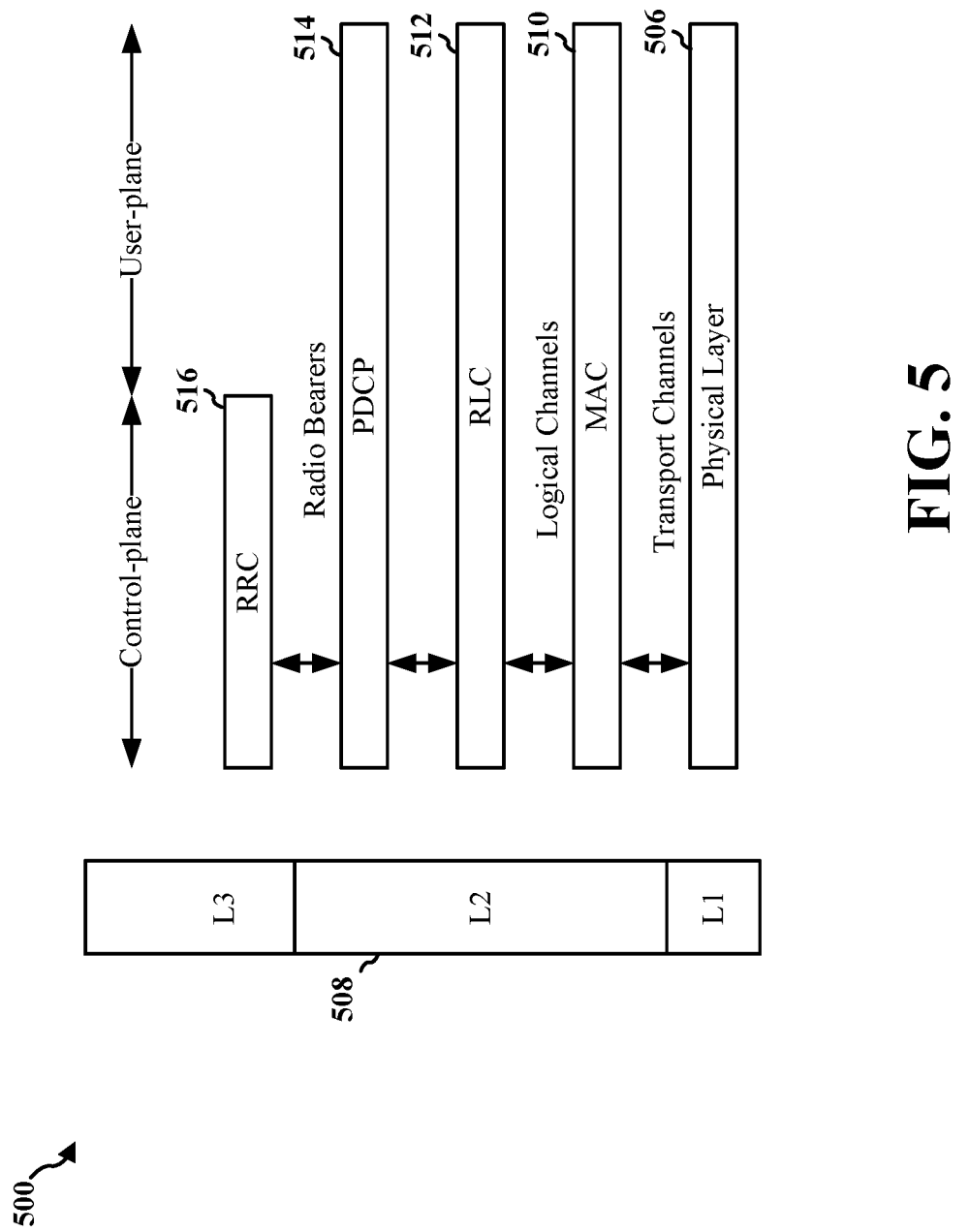
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
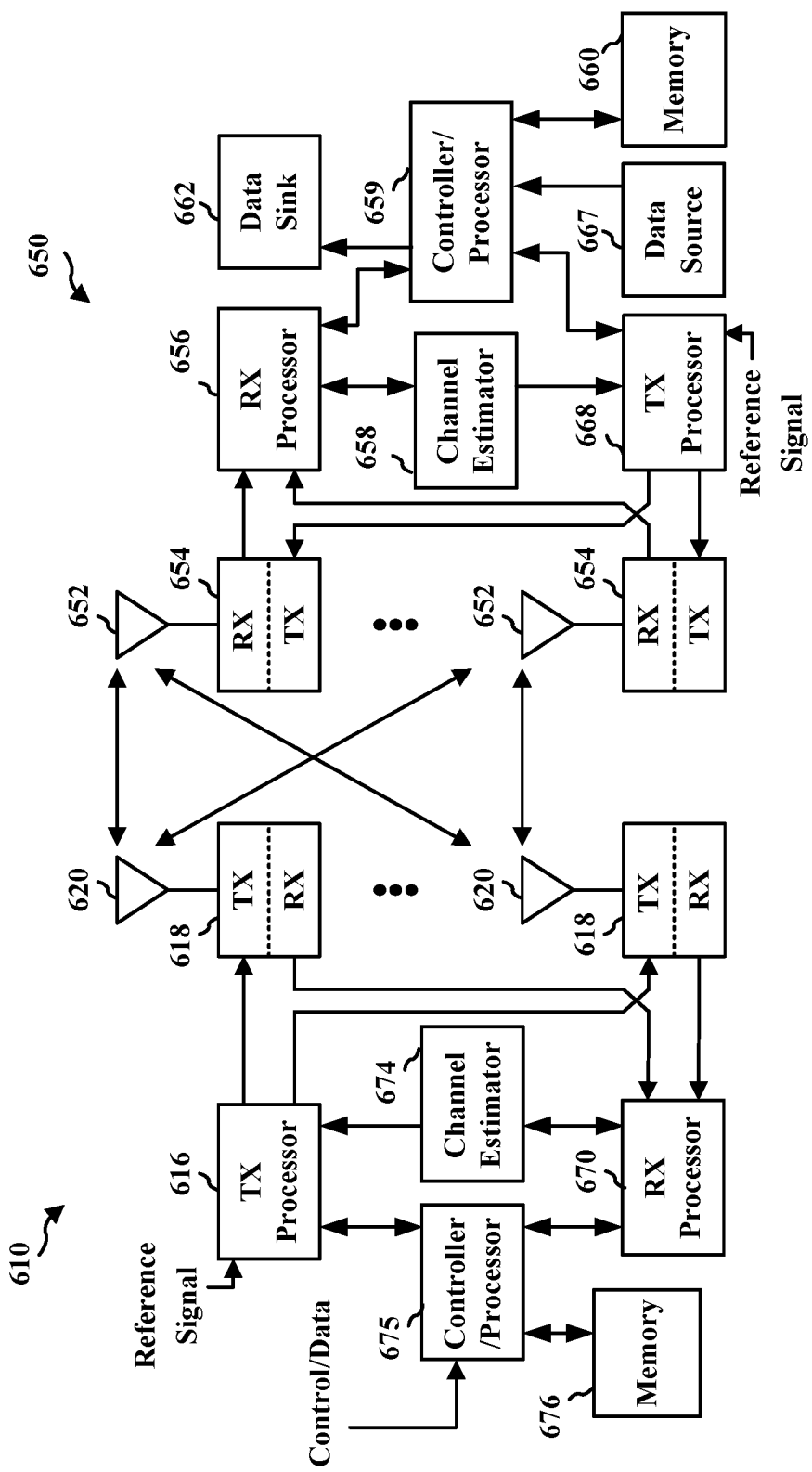
FIG. 6 is a diagram illustrating an example of an evolved Node B and user equipment in an access network.

FIG. 6 is a block diagram of a base station 610 in communication with a UE 650 in an access network. The base station 610 may be, for example, an eNB of a LTE system, a connection point (CP)/access point/base station of a millimeter wave (mmW) system, an eNB capable of communicating signals via the LTE system and the mmW system, or a connection point (CP)/access point/base station capable of communicating signals via the LTE system and the mmW system. The UE 650 may be capable of communicating signals via the LTE system and/or the mmW system. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654 RX receives a signal through its respective antenna 652. Each receiver 654 RX recovers information modulated onto an RF carrier and provides the information to receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the DL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the base station 610, the controller/processor 659 implements the L2 layer for the user plane and the control plane by providing header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the base station 610 in a manner similar to that described in connection with the receiver function at the UE 650. Each receiver 618 RX receives a signal through its respective antenna 620. Each receiver 618 RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
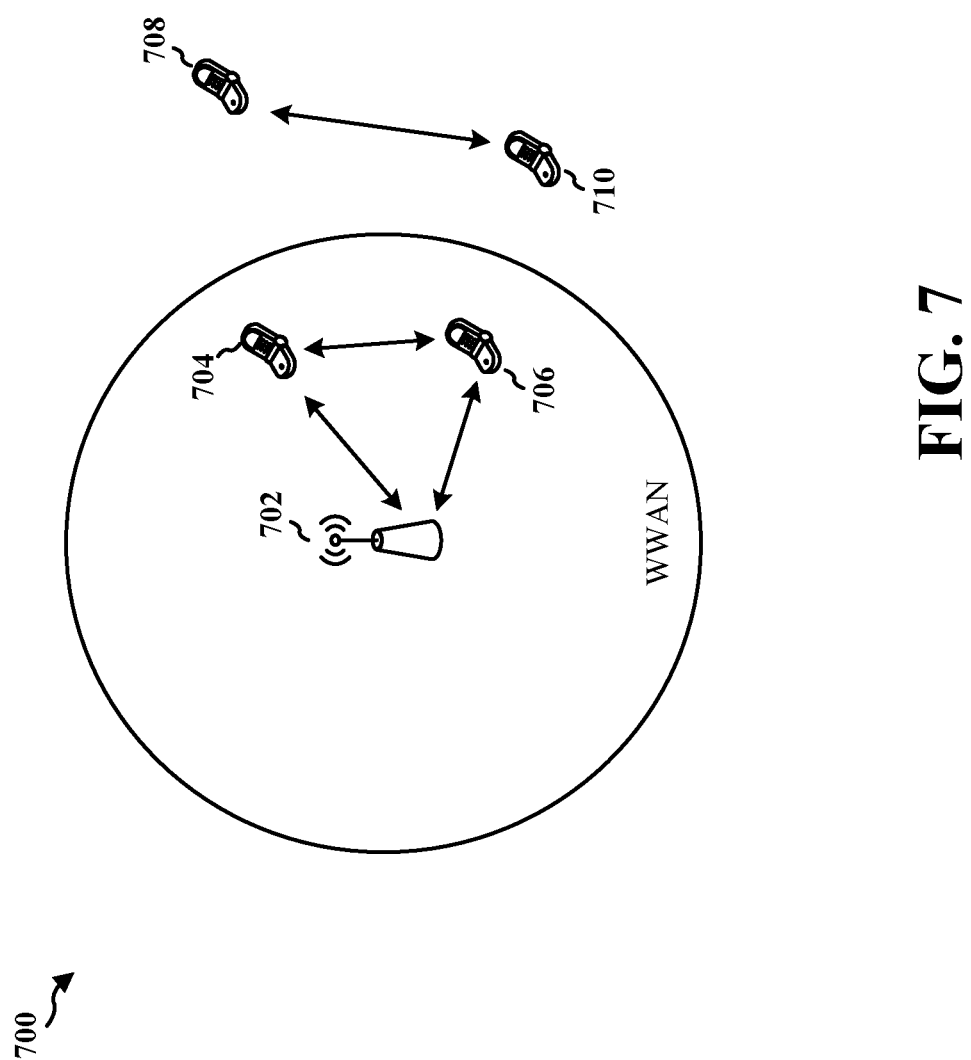
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave (mmW). Near mmW may extend down to a frequency of 3 GHz with a wavelength of 100 millimeters (the super high frequency (SHF) band extends between 3 GHz and 30 GHz, also referred to as centimeter wave). While the disclosure herein references mmWs, it should be understood that the disclosure also applies to near mmWs. Further, while the disclosure herein refers to a mmW base station, it should be understood that the disclosure also applies to near mmW base stations. The millimeter wavelength RF channel has extremely high path loss and a short range. In order to build a useful communication network in the millimeter wavelength spectrum, a beam forming technique may be used to compensate for the extreme high path loss. The beam forming technique focuses the RF energy into a narrow direction to allow the RF beam to propagate farther in that direction. Using the beam forming technique, non-line of sight (NLOS) RF communication in the millimeter wavelength spectrum may rely on reflection and/or diffraction of the beams to reach the UE. If the direction becomes blocked, either because of the UE movement or changes in the environment (e.g., obstacles, humidity, rain, etc.), the beam may not be able to reach the UE. Thus, in order to ensure that the UE has continuous, seamless coverage, multiple beams in as many different directions as possible may be available.

Beam forming techniques and methods for sustaining a link between a mobile UE and a base station in continuously changing wireless environments is provided infra.

A motivation for LTE is to increase a cellular network bandwidth for a mobile data demand. As the mobile data demand increases, various other technologies may be utilized to sustain the demand. For example, high speed mobile data may be delivered using a millimeter wave (mmW) channel.

A mmW link may be defined as the delivery of baseband symbols from a transmitter capable of mmW beamforming to a receiver capable of mmW beamforming. A mmW resource unit may include a specific combination of a beam width, a beam direction, and a timeslot. The timeslot may be a fraction of a LTE subframe and aligned with a LTE physical downlink control channel (PDCCH) frame timing. To effectively increase a receive mmW signal strength without increasing transmission power at the transmitter, beamforming may be applied. A receiver gain may be increased by reducing the mmW beam width of either, or both, the transmitter and the receiver. For example, the beam width may be changed by applying phase shifting to an antenna array.

A mmW communication system may operate at very high frequency bands (e.g., 10 GHz to 300 GHz). Such high carrier frequencies allow for the use of large bandwidth. For example, a 60 GHz mmW wireless network provides large bandwidth at approximately a 60 GHz frequency band and has the ability to support a very high data rate (e.g., up to 6.7 Gbps). The very high frequency bands may be used for backhaul communications or for network access (e.g., UEs accessing a network), for example. Applications supported by the mmW system may include uncompressed video streaming, sync-n-go file transfer, video games, and projections to wireless displays, for example.

A mmW system may operate with the help of a number of antennas and beamforming to overcome a channel having low gain. For example, heavy attenuation at high carrier frequency bands may limit a range of a transmitted signal to a few meters (e.g., 1 to 3 meters). Also, the presence of obstacles (e.g., walls, furniture, human beings, etc.) may block the propagation of a high frequency millimeter wave. As such, propagation characteristics at the high carrier frequencies necessitate the need for beamforming to overcome the loss. Beamforming may be implemented via an array of antennas (e.g., phased arrays) cooperating to beamform a high frequency signal in a particular direction to receiving devices, and therefore, extend the range of the signal. While the mmW system may operate in a stand-alone fashion, the mmW system may be implemented in conjunction with more established but lower frequency (and lower bandwidth) systems, such as LTE.

In an aspect, the present disclosure provides for cooperative techniques between the LTE system and the mmW system. For example, the present disclosure may exploit the presence of a more robust system to help with beamforming, synchronization, or discovery of a base station. Cooperation between the mmW system and a lower-frequency system (e.g., LTE) may be facilitated by the following: 1) Types of signaling for discovery, synchronization, or association on a mmW channel that can be sent over a different lower-frequency robust carrier; 2) Order of sending discovery and synchronization signaling between a mmW channel and a lower-frequency carrier (e.g., LTE); 3) Exploitation of existing connectivity; 4) Information to be included by base stations (BSs)/user equipments (UEs) in a transmitted message; and 5) Information to be included in LTE signaling.

In an aspect, mmW-capable connection points (CPs) or base stations (BSs) (network access points for mmW-capable devices) may be mounted on light poles, building sides, and/or collocated with metro cells. A mmW link may be formed by beamforming along a line of sight (LOS) or dominant reflected paths or diffracted paths around obstacles. A challenge of a mmW-capable device is to find an appropriate LOS or reflected path for beamforming.

Figure 8A:
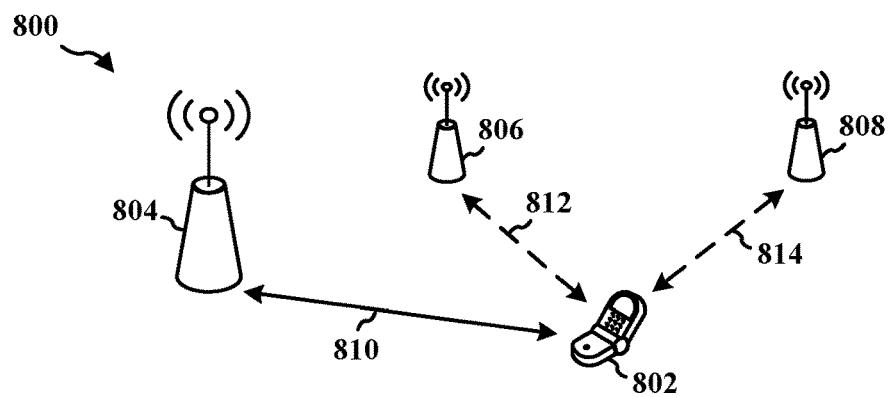
FIGS. 8A to 8C are diagrams illustrating example deployments of a mmW system used in conjunction with a LTE system.
Figure 8B:
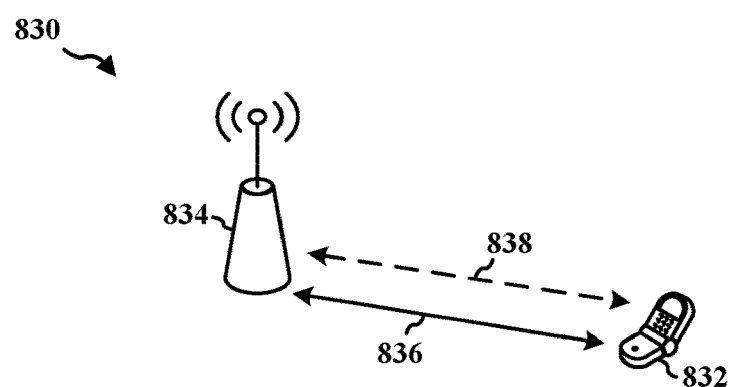
Figure 8C:
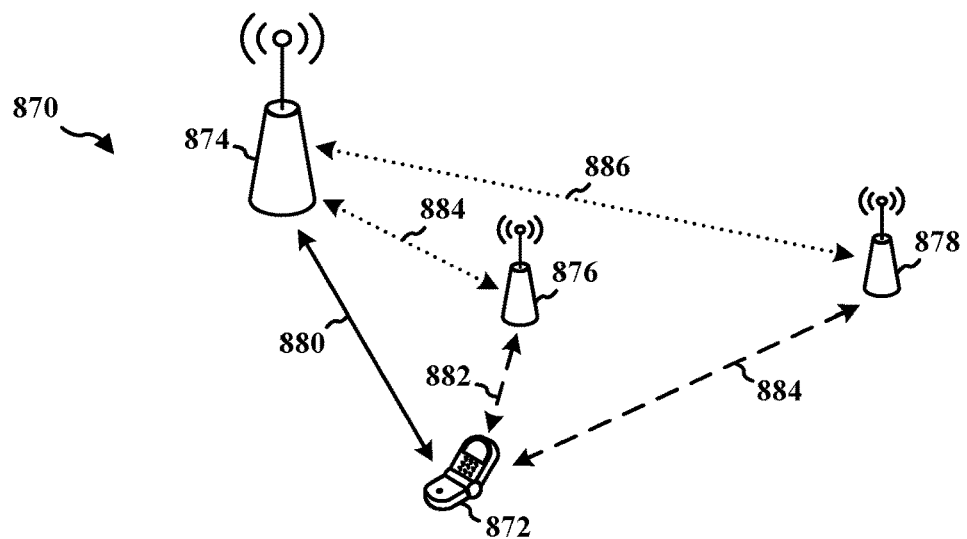

FIGS. 8A to 8C are diagrams illustrating example deployments of a mmW system used in conjunction with a LTE system. In FIG. 8A, diagram 800 illustrates a deployment where a LTE system operates independently of, and in parallel with, a mmW system. As shown in FIG. 8A, a UE 802 is capable of communicating signals via a LTE system and a mmW system. Accordingly, the UE 802 may communicate with a eNB 804 over a LTE link 810. In parallel with the LTE link 810, the UE 802 may also communicate with a first BS 806 over a first mmW link 812 and communicate with a second BS 808 over a second mmW link 814.

In FIG. 8B, diagram 830 illustrates a deployment where the LTE system and the mmW system are collocated. As shown in FIG. 8B, a UE 832 is capable of communicating signals via the LTE system and the mmW system. In an aspect, a BS 834 may be an LTE eNB capable of communicating signals via the LTE system and the mmW system. As such, the BS 834 may be referred to as a LTE+mmW eNB. In another aspect, the BS 834 may be a mmW CP capable of communicating signals via the LTE system and the mmW system. As such, the BS 834 may be referred to as a LTE+mmW BS. The UE 832 may communicate with the BS 834 over a LTE link 836. Meanwhile, the UE 832 may also communicate with the BS 834 over a mmW link 838.

In FIG. 8C, diagram 870 illustrates a deployment where a BS capable of communicating signals via the LTE system and the mmW system (LTE+mmW base station) is present with BSs capable of communicating signals via the mmW system only. As shown in FIG. 8C, a UE 872 may communicate with a LTE+mmW BS 874 over a LTE link 880. The LTE+mmW BS 874 may be a LTE+mmW eNB. In parallel with the LTE link 880, the UE 872 may also communicate with a second BS 876 over a first mmW link 882 and communicate with a third BS 878 over a second mmW link 884. The second BS 876 may further communicate with the LTE+mmW BS 874 over a first mmW backhaul link 884. The third BS 878 may further communicate with the LTE+mmW BS 874 over a second mmW backhaul link 886.

Figure 9A:
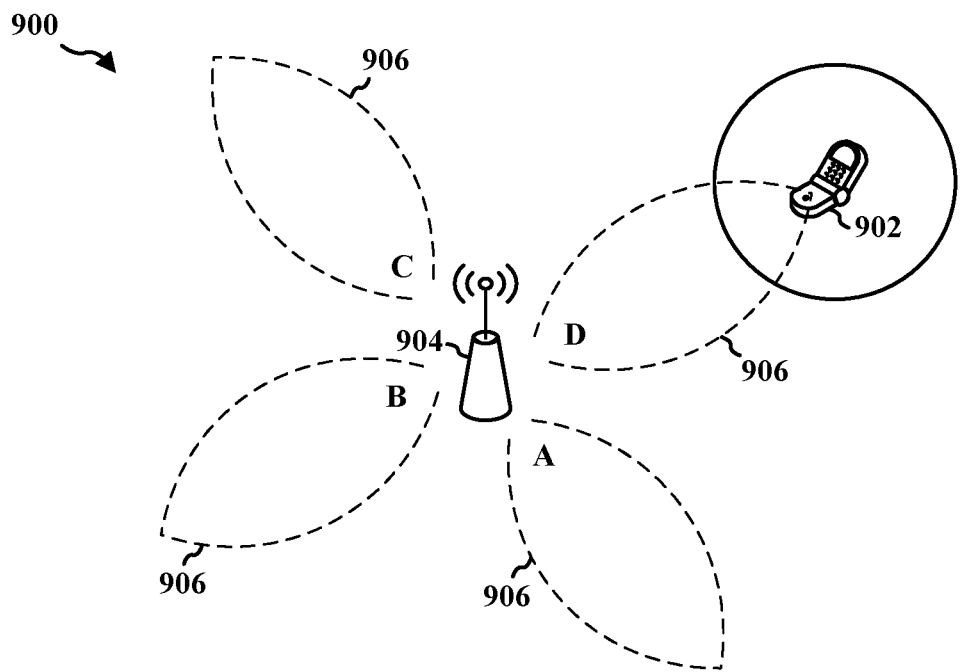
FIGS. 9A and 9B are diagrams illustrating an example of the transmission of beamformed signals between a connection point and a UE.
Figure 9B:
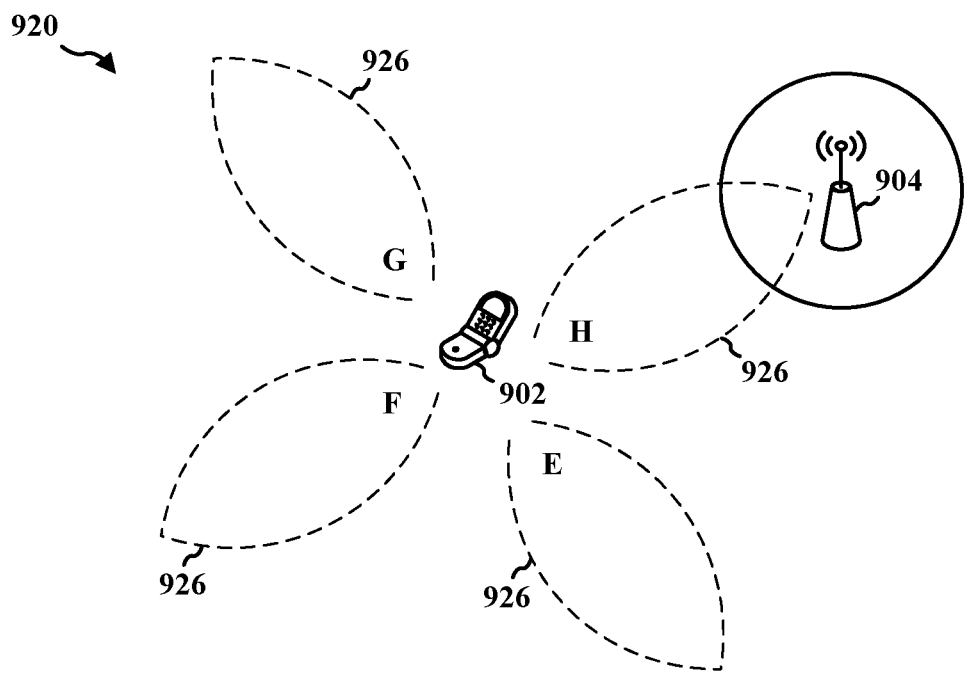

FIGS. 9A and 9B are diagrams illustrating an example of the transmission of beamformed signals between a CP and a UE. The CP may be embodied as a BS in a mmW system (mmW BS). Referring to FIG. 9A, diagram 900 illustrates a CP 904 of a mmW system transmitting beamformed signals 906 (e.g., synchronization signals or discovery signals) in different transmit directions (e.g., directions A, B, C, and D). In an example, the CP 904 may sweep through the transmit directions according to a sequence A-B-C-D. In another example, the CP 504 may sweep through the transmit directions according to the sequence B-D-A-C. Although only four transmit directions and two transmit sequences are described with respect to FIG. 9A, any number of different transmit directions and transmit sequences are contemplated.

After transmitting the signals, the CP 904 may switch to a receive mode. In the receive mode, the CP 904 may sweep through different receive directions in a sequence or pattern corresponding (mapping) to a sequence or pattern in which the CP 904 previously transmitted the synchronization/discovery signals in the different transmit directions. For example, if the CP 904 previously transmitted the synchronization/discovery signals in transmit directions according to a sequence A-B-C-D, then the CP 904 may sweep through receive directions according to the sequence A-B-C-D in an attempt to receive an association signal from a UE 902. In another example, if the CP 904 previously transmitted the synchronization/discovery signals in transmit directions according to a sequence B-D-A-C, then the CP 904 may sweep through receive directions according to the sequence B-D-A-C in an attempt to receive the association signal from the UE 902.

A propagation delay on each beamformed signal allows the UE 902 to perform a receive (Rx) sweep. The UE 902 in a receive mode may sweep through different receive directions in an attempt to detect a synchronization/discovery signal 906. One or more of the synchronization/discovery signals 906 may be detected by the UE 902. When a strong synchronization/discovery signal 906 is detected, the UE 902 may determine an optimal transmit direction of the CP 904 and an optimal receive direction of the UE 902 corresponding to the strong synchronization/discovery signal. For example, the UE 902 may determine preliminary antenna weights/directions of the strong synchronization/discovery signal 906, and may further determine a time and/or resource where the CP 904 is expected to optimally receive a beamformed signal. Thereafter, the UE 902 may attempt to associate with the CP 904 via a beamformed signal.

Referring to diagram 920 of FIG. 9B, the UE 902 may listen for beamformed discovery signals in different receive directions (e.g., directions E, F, G, and H). In an example, the UE 902 may sweep through the receive directions according to a sequence E-F-G-H. In another example, the UE 902 may sweep through the receive directions according to the sequence F-H-E-G. Although only four receive directions and two receive sequences are described with respect to FIG. 9B, any number of different receive directions and receive sequences are contemplated.

The UE 902 may attempt the association by transmitting beamformed signals 926 (e.g., association signals) in different transmit directions (e.g., directions E, F, G, and H). In an aspect, the UE 902 may transmit an association signal 926 by transmitting along the optimal receive direction of the UE 902 at the time/resource where the CP 904 is expected to optimally receive the association signal. The CP 904 in the receive mode may sweep through different receive directions and detect the association signal 926 from the UE 902 during one or more timeslots corresponding to a receive direction. When a strong association signal 926 is detected, the CP 904 may determine an optimal transmit direction of the UE 902 and an optimal receive direction of the CP 904 corresponding to the strong association signal. For example, the CP 904 may determine preliminary antenna weights/directions of the strong association signal 926, and may further determine a time and/or resource where the UE 902 is expected to optimally receive a beamformed signal. Any of the processes discussed above with respect to FIGS. 9A and 9B may be refined or repeated over time such that the UE 902 and CP 904 eventually learn the most optimal transmit and receive directions for establishing a link with each other. Such refinement and repetition may be referred to as beam training.

In an aspect, the CP 904 may choose a sequence or pattern for transmitting the synchronization/discovery signals according to a number of beamforming directions. The CP 904 may then transmit the signals for an amount of time long enough for the UE 902 to sweep through a number of beamforming directions in an attempt to detect a synchronization/discovery signal. For example, a CP beamforming direction may be denoted by n, where n is an integer from 0 to N, N being a maximum number of transmit directions. Moreover, a UE beamforming direction may be denoted by k, where k is an integer from 0 to K, K being a maximum number of receive directions. Upon detecting a synchronization/discovery signal from the CP 904, the UE 902 may discover that the strongest synchronization/discovery signal is received when the UE 902 beamforming direction is k=2 and the CP 904 beamforming direction is n=3. Accordingly, the UE 902 may use the same antenna weights/directions for responding (transmitting a beamformed signal) to the CP 904 in a corresponding response timeslot. That is, the UE 902 may send a signal to the CP 904 using UE 902 beamforming direction k=2 during a timeslot when the CP 904 is expected to perform a receive sweep at CP 904 beamforming direction n=3.

Millimeter wave systems functioning at higher carrier frequencies may occupy a bandwidth much larger than what is possible in most commercial microwave systems, e.g., cellular systems. In both mmW systems and cellular systems, the initial stages of communication between a CP and a UE allow for initial synchronization and discovery, as described above with respect to FIGS. 9A and 9B. Namely, signaling protocols during the initial stages enable UEs to discover the existence of neighboring CPs, acquire timing of the neighboring CPs, and estimate RF impairments such as a relative carrier offset between a transmitter and a receiver.

In the mmW systems that use beamforming to combat propagation path loss with an array gain, an initial stage of communication allows the UE to estimate a direction to neighboring CPs for the purpose of beamformed communication and data exchange, as described above with respect to FIGS. 9A and 9B. The signaling procedure is also further designed to allow the UE to inform the CP of its presence and associate with the CP.

In cellular systems, the UE may inform the CP of its presence by transmitting a random access channel (RACH) signal to the CP, and vice versa. Accordingly, only a few bits of data may actually be conveyed during an initial signaling process. Typically, the few bits are related to the CP's or the UE's identity. For example, $\log_2(3)<2$ bits may be effectively transmitted in a Primary Synchronization Sequence (PSS) sent by a base station of an LTE system. In an aspect, a mmW system functioning at a higher carrier frequency may leverage larger bandwidth. Accordingly, the mmW system as disclosed herein allows for the conveyance of more information during an initial signaling phase than what is currently supported in cellular systems. The conveyance of additional information over conventional systems during the initial signaling phase (e.g., discovery phase) of a directional communication system advantageously accelerates the discovery process and consequently data communication. Signaling overhead is also reduced by such conveyance since the additional information exchanged during the initial signaling phase need not be conveyed during later signaling phases using additional signals.

In the present disclosure, a discovery and association protocol is provided wherein lightweight data beyond information related to a cell ID or device ID (e.g., one or two bits) is embedded in initial synchronization signals and association signals exchanged between a CP and UE of a wireless system. The embedded data may serve to simplify and expedite a device startup procedure and ultimately data communication.

In an aspect, a CP of a directional wireless system as disclosed herein may transmit a discovery signal including additional data which allows a UE to detect the CP's presence, acquire timing and a carrier frequency of the CP, as well as infer further information about the CP's capability or configuration. The discovery signal transmitted by the CP may include a cell ID or a hashed value of a cell ID. This information may identify a cell/CP within a group of cells.

In a further aspect, the discovery signal transmitted by the CP may include information regarding the CP's beam sweep configuration. The beam sweep configuration information may include information related to whether the discovery signal is transmitted along a first beam sweep direction. This information helps the UE infer sweeping information and quantities, such as a subframe number and a periodicity of the CP's transmission sweep.

The beam sweep configuration information may also include information regarding a signal's sweep pattern. For example, the information may indicate whether sweep angles are adjacent in space, staggered, randomized, and/or repeated multiple times. This information may help with the UE's future processing/monitoring of a synchronization signal. If the sweep angles are systematically repeated, the UE may use the knowledge of the repetitions for non-coherent combining to reduce latency in the current and/or future discovery of a serving cell or other neighboring cells.

In an aspect, the discovery signal transmitted by the CP may include access configuration information (similar to RACH configuration information in an LTE system). The access configuration information may include a bit indicating whether an upcoming access resource (similar to a RACH allocation) exists in a current subframe. The access configuration information may further include information regarding a correspondence between a transmission (TX) sweep pattern used to transmit synchronization signals and a reception (RX) sweep pattern used to observe the access/association signals (similar to RACH signals). For example, the correspondence information may indicate whether the CP cycles access/association beams in a same order, opposite order, and/or permuted order at which the CP cycles synchronization beams. This information, along with the UE's knowledge of a detected synchronization timing and a slotted architecture, allows the UE to infer an ideal time to transmit access/association signals to be heard by the CP.

In a further aspect, the discovery signal transmitted by the CP may include information regarding a CP's capability. For example, the information may include a current load level indicating whether the CP can support additional users. This information helps the UE's decision regarding whether to attempt association with the CP. The information may also indicate whether the CP is capable of processing multiple receive directions through digital beamforming. Depending on the CP's capability, the information may prompt the UE to transmit access/association signals in one of multiple time slots or otherwise reduce a communication overhead. In another aspect, the discovery signal transmitted by the CP may include information indicating the existence of an upcoming symbol/resource carrying additional system data.

In an aspect, a UE receives and processes the CP's discovery signal. During processing, the UE may extract information embedded in the discovery signal. When the UE wishes to associate with the CP, the UE may transmit an association signal during an access/association opportunity determined by the UE. The access/association opportunity may be determined based on the information extracted from the CP's discovery signal. The UE may parameterize the association signal to embed lightweight data.

For example, the data embedded in the association signal may include UE identification information, a hash value of the UE identification information, a number of UE sweep directions, or a number of beams the UE can support. The data embedded in the association signal may further include UE capability information related to the UE's ability to process signals via digital beamforming. The embedded data may also include a type of data the UE expects to receive and a quality of service (QoS) requirement, latency, and/or priority level associated with the data.

In a system where the UE may send an association signal to more than one CP, the association signal may indicate whether the UE is associating with the CP to request resources for a current data communication or associating with the CP for the purpose of a future communication in the event a link with another "serving CP" fails. This information may inform the CP of a type of grant or acknowledgement the UE wishes to receive.

Figure 10:
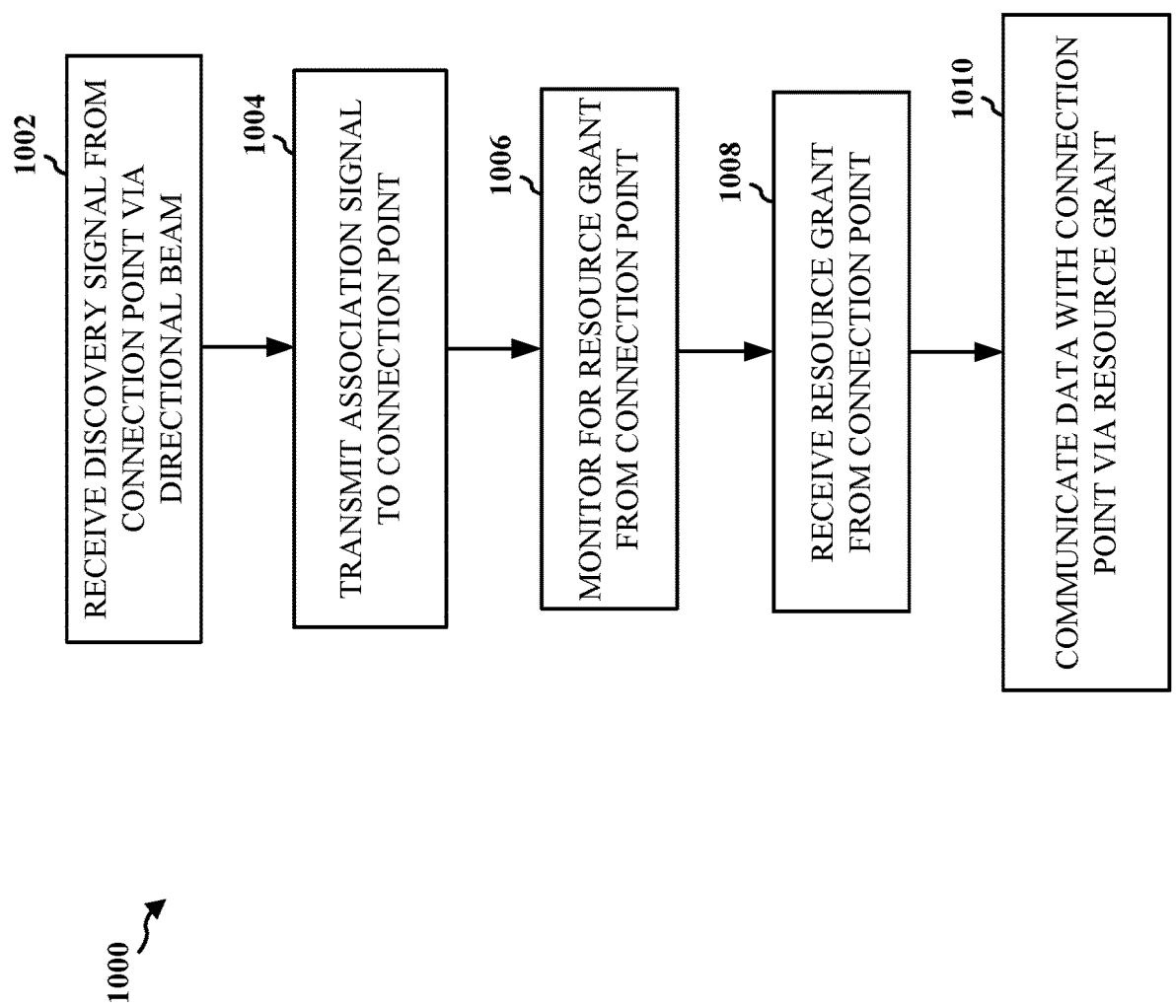
FIG. 10 is a flow chart of a method of wireless communication.

FIG. 10 is a flow chart 1000 of a method of wireless communication. The method may be performed by a UE (e.g., UE 902). At block 1002, the UE receives a discovery signal transmitted from a connection point (CP) (e.g., CP 904) via a directional beam. The discovery signal may include first information related to the CP. The first information may include beam sweep configuration information of the CP. In an aspect, the beam sweep configuration information includes a configuration for transmitting the discovery signal by the CP according to a first pattern (e.g., a transmit pattern according to sequence A-B-C-D or sequence B-D-A-C in FIG. 9A) and/or a configuration for receiving an association signal by the CP according to a second pattern (e.g., a receive pattern according to sequence A-B-C-D or sequence B-D-A-C in FIG. 9A).

In an aspect, the first information may further include a cell identifier (ID) of the CP, a hash value of the cell ID, a load level of the CP, a capability of the CP to receive the association signal in multiple beam directions, an indication of an existence and location of a symbol carrying additional information, and/or access configuration information. In a further aspect, the access configuration information may include an indication of an allocated resource for performing an association to the CP and/or a mapping between a timeslot for transmitting the association signal to the CP and a timeslot in which the discovery signal is transmitted by the CP.

At block 1004, the UE transmits the association signal to the CP based on the first information (e.g., beam sweep configuration information). The association signal may be transmitted via a second directional beam. In an aspect, the association signal may include a UE identifier (ID), a hash value of the UE ID, a configuration for receiving the discovery signal by the UE according to a first pattern (e.g., a receive pattern according to sequence E-F-G-H or sequence F-H-E-G in FIG. 9B), a configuration for transmitting the association signal by the UE according to a second pattern (e.g., a transmit pattern according to sequence E-F-G-H or sequence F-H-E-G in FIG. 9B), a capability of the UE to receive the discovery signal in multiple beam directions, a type of data the UE expects to receive, a quality of service (QoS) requirement associated with the data, and/or an indicator of whether the UE is associating with the CP to request resources for a current data communication or associating with the CP for a future data communication.

At block 1006, the UE monitors for a resource grant from the CP based on the transmitted association signal. At block 1008, the UE receives the resource grant from the CP. The resource grant may be transmitted from the CP upon receiving and processing the UE's association signal. Thereafter, at block 1010, the UE communicates data with the CP via the resource grant.

Figure 11:
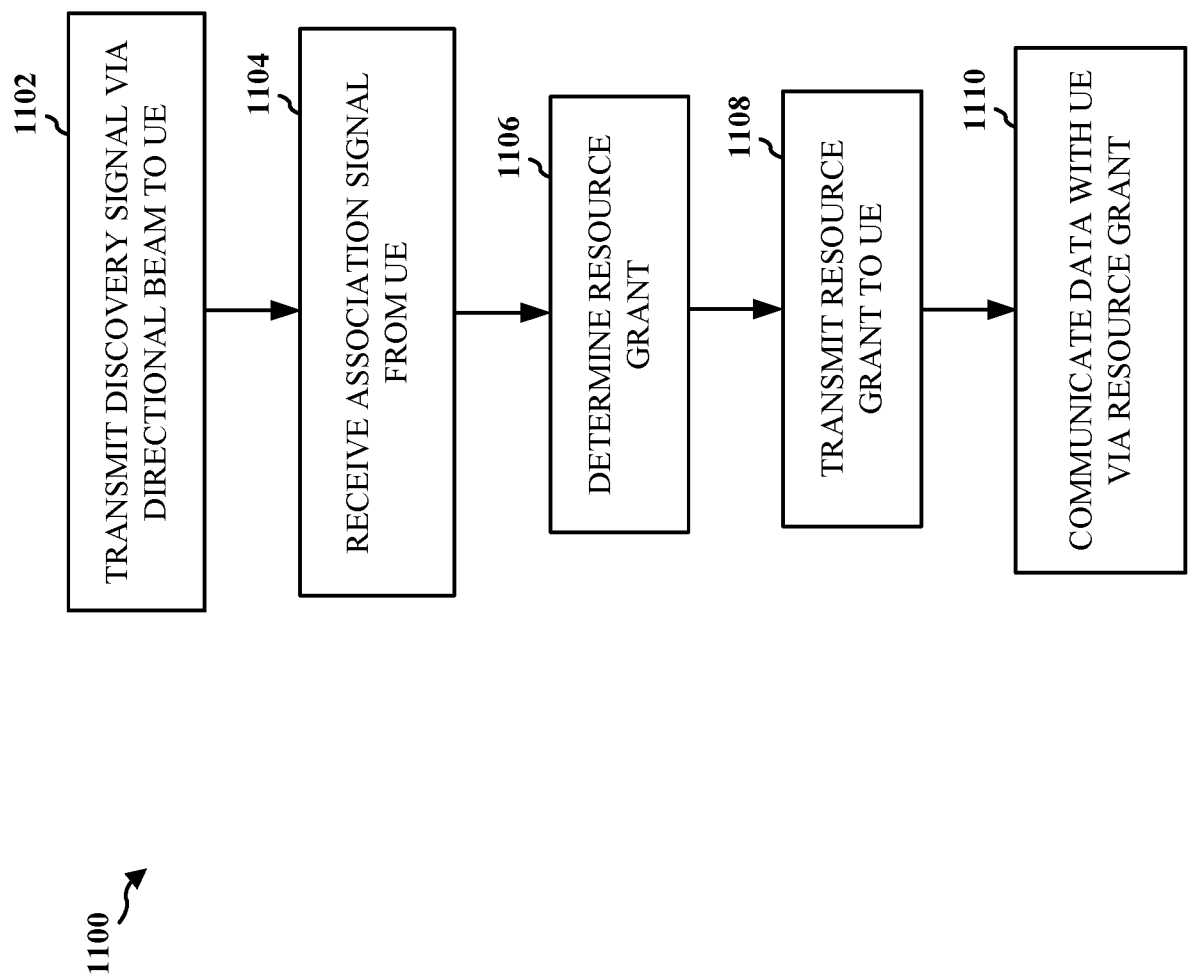
FIG. 11 is a flow chart of a method of wireless communication.

FIG. 11 is a flow chart 1100 of a method of wireless communication. The method may be performed by a CP (e.g., CP 904). At block 1102, the CP transmits a discovery signal via a directional beam to a UE (e.g., UE 902). The discovery signal may include first information related to the CP. The first information may include beam sweep configuration information. In an aspect, the beam sweep configuration information may include a configuration for transmitting the discovery signal by the CP according to a first pattern (e.g., a transmit pattern according to sequence A-B-C-D or sequence B-D-A-C in FIG. 9A). Additionally or alternatively, the beam sweep configuration information may include a configuration for receiving an association signal by the CP according to a second pattern (e.g., a receive pattern according to sequence A-B-C-D or sequence B-D-A-C in FIG. 9A).

In an aspect, the first information may further include a cell identifier (ID) of the CP, a hash value of the cell ID, a load level of the CP, a capability of the CP to receive the association signal in multiple beam directions, an indication of an existence and location of a symbol carrying additional information, and/or access configuration information. In a further aspect, the access configuration information may include an indication of an allocated resource for performing an association to the CP, and/or a mapping between a timeslot for receiving the association signal by the CP and a timeslot in which the discovery signal is transmitted by the CP.

At block 1104, the CP receives the association signal from the UE based on the first information (e.g., beam sweep configuration information). The association signal may be received via a second directional beam. In an aspect, the association signal includes a UE identifier (ID), a hash value of the UE ID, a configuration for receiving the discovery signal by the UE according to a first pattern (e.g., a receive pattern according to sequence E-F-G-H or sequence F-H-E-G in FIG. 9B), a configuration for transmitting the association signal by the UE according to a second pattern (e.g., a transmit pattern according to sequence E-F-G-H or sequence F-H-E-G in FIG. 9B), a capability of the UE to receive the discovery signal in multiple beam directions, a type of data the UE expects to receive, a quality of service (QoS) requirement associated with the data, and/or an indicator of whether the UE is associating with the CP to request resources for a current data communication or associating with the CP for a future data communication.

At block 1106, the CP determines a resource grant for communicating with the UE based on the received association signal. At block 1108, upon processing the association signal from the UE, the CP transmits a resource grant to the UE. Thereafter, at block 1110, the CP communicates data with the UE via the resource grant.

Figure 12:
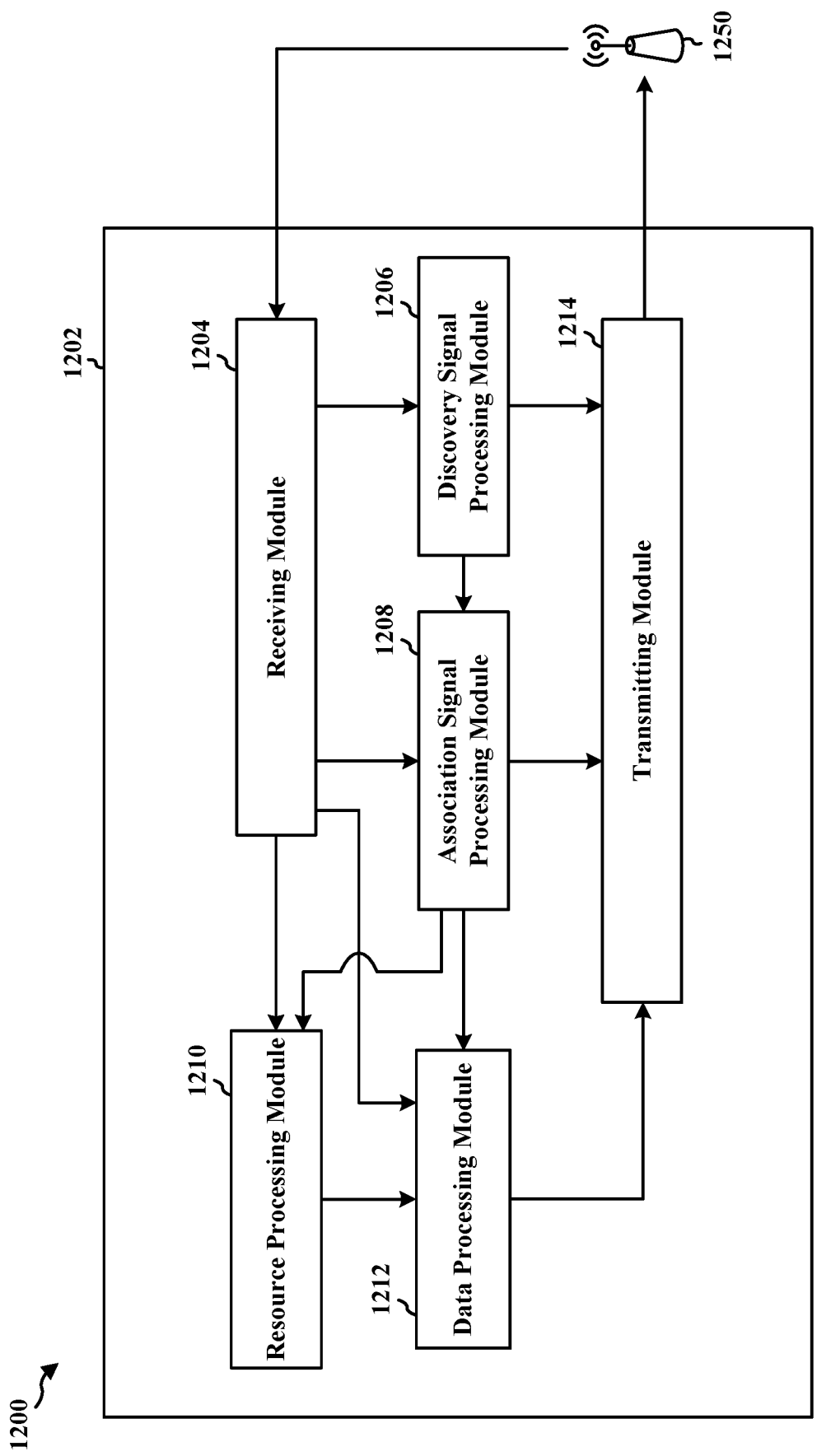
FIG. 12 is a data flow diagram illustrating the data flow between different modules/means/components in an exemplary apparatus.

FIG. 12 is a data flow diagram 1200 illustrating the data flow between different modules/means/components in an exemplary apparatus 1202. The apparatus may be a UE (e.g., UE 902). The apparatus includes a receiving module 1204, a discovery signal processing module 1206, an association signal processing module 1208, a resource processing module 1210, a data processing module 1212, and a transmitting module 1214.

The discovery signal processing module 1206 receives (via the receiving module 1204) a discovery signal transmitted from a CP (e.g., CP 1250) via a directional beam. The discovery signal may include first information related to the CP. The first information may include beam sweep configuration information. In an aspect, the beam sweep configuration information includes a configuration for transmitting the discovery signal by the CP according to a first pattern (e.g., a transmit pattern according to sequence A-B-C-D or sequence B-D-A-C in FIG. 9A) and/or a configuration for receiving an association signal by the CP according to a second pattern (e.g., a receive pattern according to sequence A-B-C-D or sequence B-D-A-C in FIG. 9A).

In an aspect, the first information may further include a cell identifier (ID) of the CP, a hash value of the cell ID, a load level of the CP, a capability of the CP to receive the association signal in multiple beam directions, an indication of an existence and location of a symbol carrying additional information, and/or access configuration information. In a further aspect, the access configuration information may include an indication of an allocated resource for performing an association to the CP, and/or a mapping between a timeslot for transmitting the association signal to the CP and a timeslot in which the discovery signal is transmitted by the CP.

The association signal processing module 1208 transmits (via the transmitting module 1214) the association signal to the CP based on the first information (e.g., beam sweep configuration information). The association signal may be transmitted via a second directional beam. In an aspect, the association signal may include an identifier (ID) of the apparatus 1202, a hash value of the ID of the apparatus 1202, a configuration for receiving the discovery signal by the apparatus 1202 according to a first pattern (e.g., a receive pattern according to sequence E-F-G-H or sequence F-H-E-G in FIG. 9B), a configuration for transmitting the association signal by the apparatus 1202 according to a second pattern (e.g., a transmit pattern according to sequence E-F-

G-H or sequence F-H-E-G in FIG. 9B), a capability of the apparatus 1202 to receive the discovery signal in multiple beam directions, a type of data the apparatus 1202 expects to receive, a quality of service (QoS) requirement associated with the data, and/or an indicator of whether the apparatus 1202 is associating with the CP to request resources for a current data communication or associating with the CP for a future data communication.

The resource processing module 1210 monitors for a resource grant from the CP based on the transmitted association signal. The resource processing module 1210 receives (via the receiving module 1204) the resource grant from the CP. The resource grant may be transmitted from the CP upon receiving and processing the association signal from the apparatus 1202. Thereafter, the data processing module 1212 communicates (via the receiving module 1204 and the transmitting module 1214) data with the CP via the resource grant.

The apparatus 1202 may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
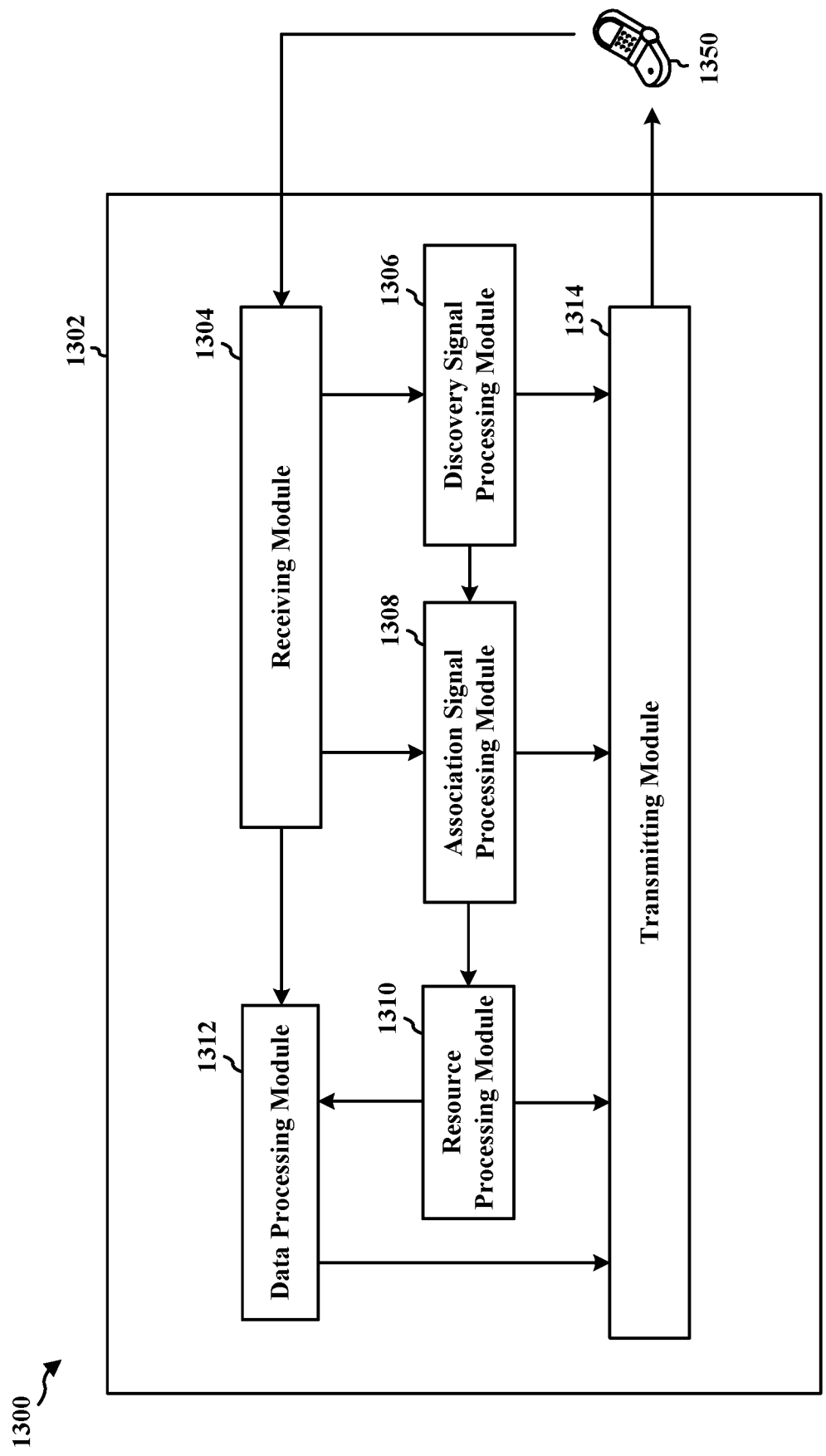
FIG. 13 is a data flow diagram illustrating the data flow between different modules/means/components in an exemplary apparatus.

FIG. 13 is a data flow diagram 1300 illustrating the data flow between different modules/means/components in an exemplary apparatus 1302. The apparatus may be a CP (e.g., CP 904). The apparatus includes a receiving module 1304, a discovery signal processing module 1306, an association signal processing module 1308, a resource processing module 1310, a data processing module 1312, and a transmitting module 1314.

The discovery signal processing module 1306 transmits (via the transmitting module 1314) a discovery signal via a directional beam to a UE (e.g. UE 1350). The discovery signal may include first information related to the apparatus 1302. The first information may include beam sweep configuration information. In an aspect, the beam sweep configuration information may include a configuration for transmitting the discovery signal by the apparatus 1302 according to a first pattern (e.g., a transmit pattern according to sequence A-B-C-D or sequence B-D-A-C in FIG. 9A) and/or a configuration for receiving an association signal by the apparatus 1302 according to a second pattern (e.g., a receive pattern according to sequence A-B-C-D or sequence B-D-A-C in FIG. 9A).

In an aspect, the first information may further include a cell identifier (ID) of the apparatus 1302, a hash value of the cell ID, a load level of the apparatus 1302, a capability of the apparatus 1302 to receive the association signal in multiple beam directions, an indication of an existence and location of a symbol carrying additional information, and/or access configuration information. In a further aspect, the access configuration information may include an indication of an allocated resource for performing an association to the apparatus 1302, and/or a mapping between a timeslot for receiving the association signal by the apparatus 1302 and a timeslot in which the discovery signal is transmitted by the apparatus 1302.

The association signal processing module 1308 receives (via the receiving module 1304) the association signal from the UE based on the first information (e.g., beam sweep configuration information). The association signal may be received via a second directional beam. In an aspect, the association signal includes a UE identifier (ID), a hash value of the UE ID, a configuration for receiving the discovery signal by the UE according to a first pattern (e.g., a receive pattern according to sequence E-F-G-H or sequence F-H-E-G in FIG. 9B), a configuration for transmitting the association signal by the UE according to a second pattern (e.g., a transmit pattern according to sequence E-F-G-H or sequence F-H-E-G in FIG. 9B), a capability of the UE to receive the discovery signal in multiple beam directions, a type of data the UE expects to receive, a quality of service (QoS) requirement associated with the data, and/or an indicator of whether the UE is associating with the apparatus 1302 to request resources for a current data communication or associating with the apparatus 1302 for a future data communication.

The resource processing module 1310 determines a resource grant for communicating with the UE based on the received association signal. Upon processing the association signal from the UE, the resource processing module 1310 transmits (via the transmitting module 1314) the resource grant to the UE. Thereafter, the data processing module 1312 communicates (via the receiving module 1304 and the transmitting module 1314) data with the UE via the resource grant.

The apparatus may include additional modules that perform each of the steps of the algorithm in the aforementioned flow chart of FIG. 11. As such, each step in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
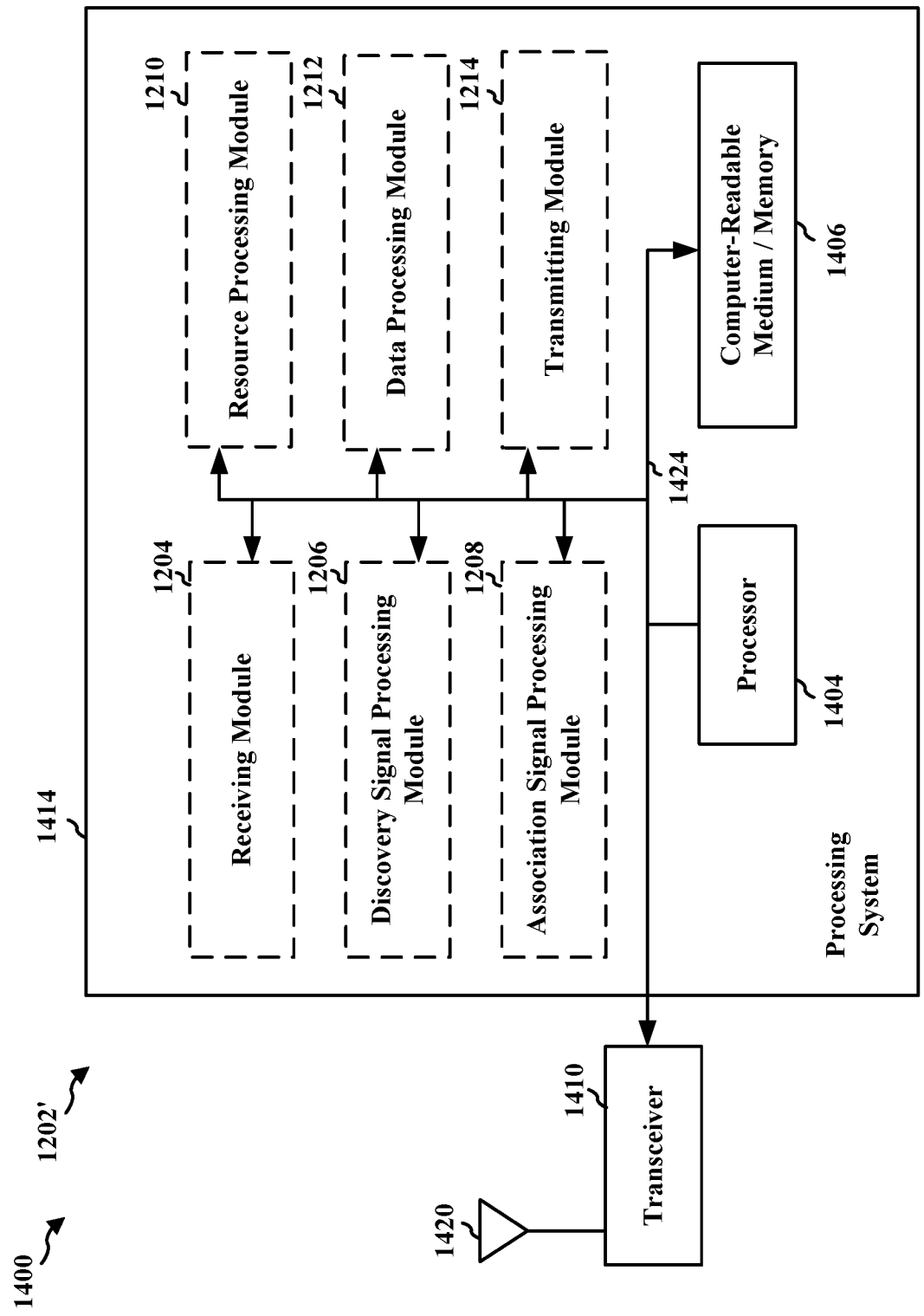
FIG. 14 is a diagram illustrating an example of a hardware implementation for an apparatus employing a processing system.

FIG. 14 is a diagram 1400 illustrating an example of a hardware implementation for an apparatus 1202' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1204, 1206, 1208, 1210, 1212, 1214, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1204. In addition, the transceiver 1410 receives information from the processing system 1414, specifically the transmitting module 1214, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1204, 1206, 1208, 1210, 1212, and 1214. The modules may be software modules running in the processor 1404, resident/stored in the computer readable medium/memory 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1202/1202' for wireless communication includes means for receiving a discovery signal transmitted from a connection point (CP) via a directional beam, wherein the discovery signal comprises first information related to the CP, the first information comprising beam sweep configuration information, means for transmitting an association signal to the CP based on the beam sweep configuration information, means for monitoring for a resource grant from the CP based on the transmitted association signal, means for receiving the resource grant from the CP, and means for communicating data with the CP via the resource grant.

The aforementioned means may be one or more of the aforementioned modules of the apparatus 1202 and/or the processing system 1414 of the apparatus 1202' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 15:
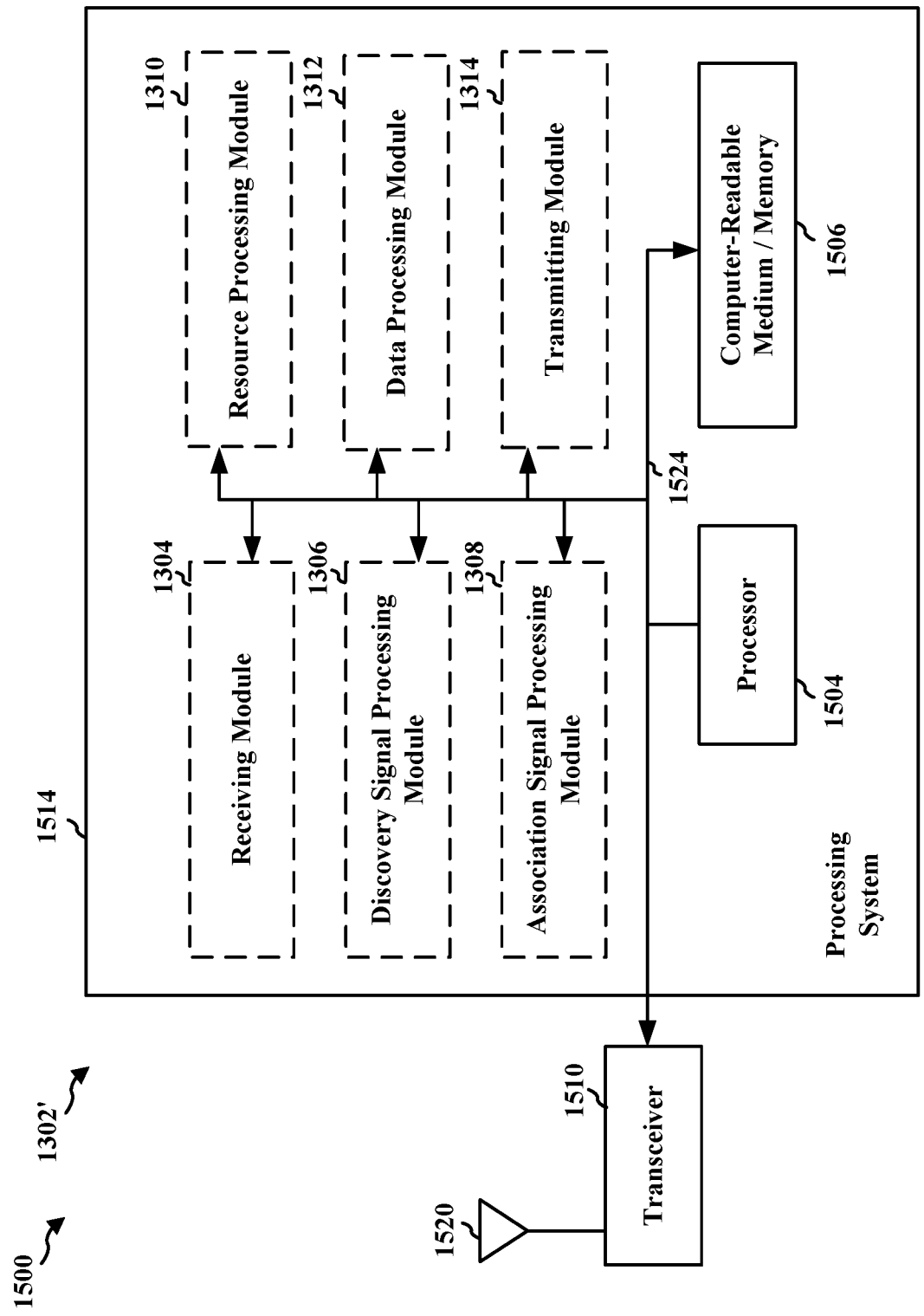
FIG. 15 is a diagram illustrating an example of a hardware implementation for an apparatus employing a processing system.

FIG. 15 is a diagram 1500 illustrating an example of a hardware implementation for an apparatus 1302' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1304, 1306, 1308, 1310, 1312, 1314, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the receiving module 1304. In addition, the transceiver 1510 receives information from the processing system 1514, specifically the transmitting module 1314, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1304, 1306, 1308, 1310, 1312, and 1314. The modules may be software modules running in the processor 1504, resident/stored in the computer readable medium/memory 1506, one or more hardware modules coupled to the processor 1504, or some combination thereof. The processing system 1514 may be a component of the CP 610 and may include the memory 676 and/or at least one of the TX processor 616, the RX processor 670, and the controller/processor 675.

In one configuration, the apparatus 1302/1302' for wireless communication includes means for transmitting a discovery signal via a directional beam to a user equipment (UE), wherein the discovery signal comprises first information related to the CP, the first information comprising beam sweep configuration information, means for receiving an association signal from the UE based on the beam sweep configuration information, means for determining a resource grant for communicating with the UE based on the received association signal, means for transmitting the resource grant to the UE, and means for communicating data with the UE via the resource grant.

The aforementioned means may be one or more of the aforementioned modules of the apparatus 1302 and/or the processing system 1514 of the apparatus 1302' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), the method comprising:
   receiving, via at least one first directional beam, at least one synchronization signal from a connection point (CP);
   determining at least one resource allocated for association with the CP based on the at least one synchronization signal; and
   transmitting, via at least one second directional beam, at least one association signal on the at least one resource allocated for the association with the CP, wherein the at least one association signal indicates information corresponding to an identifier (ID) of the UE and includes an indicator of whether the UE is associating with the CP for a current data communication or for a future data communication, wherein the information corresponding to the ID of the UE comprises one of a set of bits corresponding to at least a portion of the ID of the UE or a hash value of the ID of the UE.

2. The method of claim 1, wherein the at least one resource is allocated on a random access channel (RACH), and wherein the at least one association signal comprises a RACH signal.

3. The method of claim 1, wherein the determining the least one resource allocated for the association with the CP is based on at least one of:
   information included in the at least one synchronization signal indicating the at least one resource allocated for the association with the CP, or
   a mapping between a first resource on which one of the at least one synchronization signal is transmitted by the CP and the at least one resource allocated for the association with the CP.

4. The method of claim 1, wherein the determining the at least one resource allocated for the association with the CP based on the at least one synchronization signal comprises:
   determining the at least one resource allocated for the association with the CP based on a strongest synchronization signal of the at least one synchronization signal received via one of the at least one first directional beam.

5. The method of claim 4, wherein the at least one resource allocated for the association with the CP comprises at least one time resource corresponding to a first beam direction of the CP via which the strongest synchronization signal is transmitted by the CP.

6. The method of claim 5, wherein the at least one synchronization signal indicates a sequence of beam directions via which the CP receives the at least one association signal, and wherein the sequence of beam directions includes the first beam direction of the CP.

7. The method of claim 1, wherein the at least one synchronization signal further comprises information indicating a capability of the CP to receive the at least one association signal in a sequence of beam directions, and wherein the at least one association signal is transmitted via a plurality of second directional beams of the at least one second directional beam based on the capability of the CP.

8. The method of claim 7, wherein the at least one synchronization signal further indicates at least one of:
   information corresponding to an ID of a cell provided by the CP,
   a load level of the CP, or
   an indication of at least one other resource on which additional system data associated with the CP is transmitted by the CP.

9. The method of claim 1, further comprising:
   receiving scheduling information from the CP based on the at least one association signal; and
   communicating with the CP based on the scheduling information.

10. The method of claim 9, further comprising:
    acquiring at least one of timing synchronization or a carrier frequency associated with the communicating with the CP based on the at least one synchronization signal.

11. A method of wireless communication by a connection point (CP), the method comprising:
    transmitting at least one synchronization signal via at least one first directional beam; and
    receiving, from a user equipment (UE) via at least one second directional beam, at least one association signal indicating information corresponding to an identifier (ID) of the UE and includes an indicator of whether the UE is associating with the CP for a current data communication or for a future data communication, wherein the at least one association signal is received on at least one resource indicated as allocated for association with the CP based on the at least one synchronization signal, and wherein the information corresponding to the ID of the UE comprises one of a set of bits corresponding to at least a portion of the ID of the UE or a hash value of the ID of the UE.

12. The method of claim 11, further comprising:
    transmitting, to the UE, scheduling information associated with communication with the CP based on the at least one association signal; and
    communicating with the UE based on the scheduling information.

13. The method of claim 11, wherein the at least one resource is allocated on a random access channel (RACH), and wherein the at least one association signal comprises a RACH signal.

14. The method of claim 11, wherein the at least one association signal received on the at least one resource is indicated as allocated for the association with the CP based on at least one of:
    information included in the at least one synchronization signal indicating the at least one resource allocated for the association with the CP, or a mapping between a first resource on which one of the at least one synchronization signal is transmitted by the CP and the at least one resource allocated for the association with the CP.

15. The method of claim 14, wherein the at least one resource allocated for the association with the CP comprises at least one time resource corresponding to the first resource on which the one of the at least one synchronization signal is transmitted via one of the at least one first directional beam.

16. The method of claim 15, wherein the at least one synchronization signal indicates a sequence of the at least one first directional beam via which the CP receives the at least one association signal, and wherein the sequence of the at least one first directional beam includes the one of the at least one first directional beam.

17. The method of claim 16, wherein the at least one synchronization signal further indicates at least one of:
information corresponding to an ID of a cell provided by the CP,
a load level of the CP, or
an indication of at least one other resource on which additional system data associated with the CP is transmitted by the CP.

18. An apparatus for wireless communication by a user equipment (UE), the apparatus comprising:
a memory; and
at least one processor coupled to the memory and configured to:
receive, via at least one first directional beam, at least one synchronization signal from a connection point (CP);
determine at least one resource allocated for association with the CP based on the at least one synchronization signal; and
transmit, via at least one second directional beam, at least one association signal on the at least one resource allocated for the association with the CP, wherein the at least one association signal indicates information corresponding to an identifier (ID) of the UE and includes an indicator of whether the UE is associating with the CP for a current data communication or for a future data communication, wherein the information corresponding to the ID of the UE comprises one of a set of bits corresponding to at least a portion of the ID of the UE or a hash value of the ID of the UE.

19. The apparatus of claim 18, wherein the at least one resource is allocated on a random access channel (RACH), and wherein the at least one association signal comprises a RACH signal.

20. The apparatus of claim 18, wherein the determination of the least one resource allocated for the association with the CP is based on at least one of:
information included in the at least one synchronization signal indicating the at least one resource allocated for the association with the CP, or
a mapping between a first resource on which one of the at least one synchronization signal is transmitted by the CP and the at least one resource allocated for the association with the CP.

21. The apparatus of claim 20, wherein the determination of the at least one resource allocated for the association with the CP based on the at least one synchronization signal comprises to:
determine the at least one resource allocated for the association with the CP based on a strongest synchronization signal of the at least one synchronization signal received via one of the at least one first directional beam.

22. The apparatus of claim 21, wherein the at least one resource allocated for the association with the CP comprises at least one time resource corresponding to a first beam direction of the CP via which the strongest synchronization signal is transmitted by the CP.

23. An apparatus for wireless communication by a connection point (CP), the apparatus comprising:
a memory; and
at least one processor coupled to the memory and configured to:
transmit at least one synchronization signal via at least one first directional beam; and
receive, from a user equipment (UE) via at least one second directional beam, at least one association signal indicating information corresponding to an identifier (ID) of the UE and including an indicator of whether the UE is associating with the CP for a current data communication or for a future data communication, wherein the at least one association signal is received on at least one resource indicated as allocated for association with the CP based on the at least one synchronization signal, and wherein the information corresponding to the ID of the UE comprises one of a set of bits corresponding to at least a portion of the ID of the UE or a hash value of the ID of the UE.

24. The apparatus of claim 23, wherein the at least one processor is further configured to:
transmit, to the UE, scheduling information associated with the communication with the CP based on the at least one association signal; and
communicate with the UE based on the scheduling information.

25. The apparatus of claim 23, wherein the at least one resource is allocated on a random access channel (RACH), and wherein the at least one association signal comprises a RACH signal.

26. The apparatus of claim 23, wherein the at least one association signal received on the at least one resource is indicated as allocated for the association with the CP based on at least one of:
information included in the at least one synchronization signal indicating the at least one resource allocated for the association with the CP, or
a mapping between a first resource on which one of the at least one synchronization signal is transmitted by the CP and the at least one resource allocated for the association with the CP.

* * * * *